United States Patent Office 3,480,593
Patented Nov. 25, 1969

3,480,593
CONDENSATION POLYMERS OF BENZIMIDAZOLONE
Paul J. George, West Richfield, Ohio, assignor to The B. F. Goodrich Company, New York, N.Y., a corporation of New York
No Drawing. Filed June 22, 1967, Ser. No. 647,902
Int. Cl. C08g 20/20, 33/02
U.S. Cl. 260—77.5                                    9 Claims

ABSTRACT OF THE DISCLOSURE

Benzimidazolone and difunctional halogen-containing compounds, wherein the difunctionality consists of an acid halide or haloalkyl grouping, are reacted to form highly stable condensation polymers containing amide linkages and having highly rigid backbones. The thermoplastic polymers of this invention are useful as coating agents and are capable of being drawn into fibers.

SUMMARY OF THE INVENTION

I have now found that by reacting a benzimidazolone with difunctional compounds containing reactive halogen, condensation polymers, characterized by the presence of recurring structural units having the formula

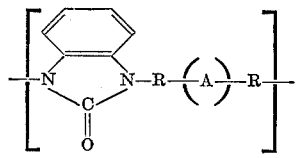

wherein R can be either a carbonyl group or a methylene group and A is an alkylene or phenylene radical, are formed. This structure is highly desirable for its stability due to the presence of the stable amide linkages and rigidity of the polymer backbone.

The polymers of this invention are polymers formed by the condensation of benzimidazolone and an aromatic or aliphatic diacid halide or an alpha, omega aliphatic dihalide or an aromatic compound containing two halomethyl groups, wherein the reactants are arranged in an alternate fashion throughout the polymer backbone. The linear polymers are highly stable and heat resistant, possess high melting points and are capable of being drawn into fibers as well as being useful for a variety of other thermoplastic applications.

DETAILED DESCRIPTION OF THE INVENTION

The benzimidazolones (sometimes called benzimidazolinones) which may be condensed to form polymers according to the present invention correspond to the structural formula

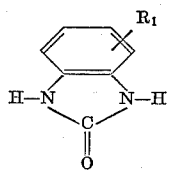

wherein $R_1$ represents hydrogen or an alkyl group containing from 1 to 18 carbon atoms, and preferably containing from 1 to 8 carbon atoms. It is to be understood that the aromatic ring may contain two or more alkyl substituents and still fall within the scope of the present invention. Other groups which will not interfere with the polymerization reaction, such as an aryl group, an alkoxy group, the nitro group, halogens, or the like may also be substituted on the aromatic ring.

The preferred group of difunctional compounds containing reactive halogen for condensation with the benzimidazolone includes compounds having the structural formula $$X—R_2(A)R_2—X$$

wherein $R_2$ is a carbonyl or methylene group, X is a halogen, A is an alkylene radical containing from 1 to 8 carbon atoms or a phenylene radical wherein the two functional groups may be located in any position with relation to each other, either ortho, meta or para, and the remaining four positions on the phenylene radical may be either hydrogen or alkyl radicals containing from 1 to 12 carbon atoms. There is no restriction on the number or position of the alkyl groups substituted on the phenylene ring, except that if the alkyl group is a tertiary alkyl group, it should not be immediately adjacent to either of the two halogen-containing functional groups. When an aliphatic dihalide or diacid halide is employed, the number of methylene groups separating two benzimidazolone units will not exceed 10, and best results have been obtained when the number of methylene units is 6 or less, in order to maintain the necessary rigidity of the polymer backbone and enhance the stability of the polymer. Preferred difunctional compounds containing reactive halogen include: terephthaloyl, isophthaloyl and phthaloyl halides; 1,4-, 1,3- and 1,2-bis(halomethyl)benzenes; 1,4-bis(halomethyl)tetramethylbenzene; 1,5-dihalopentane; halides of aliphatic acids such as malonic acid, succinic acid, adipic acid, pimelic acid; and the like. Bromine and chlorine are preferred halogens.

In conducting the condensation polymerization, it is not absolutely essential that the reactants be employed in equivalent proportions; however, to form high molecular weight polymerizates, it is best that the molar ratio of benzimidazolone to difunctional halogen-containing compound be about 1:1. A 10 to 20% excess of either reactant may be employed if desired, however, by maintaining a 1:1 mol ratio of reactants, the polymer obtained will have a high molecular weight than if an excess of one of the reactants had been employed. On this basis, it is desirable that the reactants be as pure as possible before use, that is, that they not contain undue amounts of other material and that the reactive halogen-containing compound contain two functional groups per molecule in order to avoid undue termination of the polymer chains. Contaminants which could react with either of the reactants must also be avoided to insure the preparation of high molecular weight polymers.

Reaction temperatures may range from about 20° C. to about 350° C. or higher. Excellent results have been obtained when the temperature was maintained between about 100° C. and 250° C. The precise reaction temperature will depend to a large extent on the reactivities of the materials to be reacted. The condensation is generally carried out at atmospheric pressure; however, it may be desirable to conduct the reaction at pressures greater than atmospheric and in some instances to even employ an inert atmosphere of nitrogen, argon, helium or the like.

The polymers of this invention can be readily prepared by reacting the benzimidazolones and the difunctional halogen-containing compound in an inert diluent, which may or may not be a solvent for the reactants and the polymer. Any material not capable of reaction with the reactants can be employed as the diluent. Excellent results have been obtained where the diluent employed was also a solvent for the reactants. Such solvents include: aromatic hydrocarbons and halogenated aromatic hydrocarbons; tertiary amines; N,N-disubstituted amides, such as dimethyl formamide and dimethyl acetamide; sulfones, such as tetramethylene sulfone; lactones, such as γ-butyrolactone; ethers, such as diphenyl ether and tetrahydrofuran; nitriles; esters and the like. The copolymers can also be made by mass reaction at higher temperatures for shorter periods of time, and in general the polymers obtained cannot be distinguished from those obtained through other techniques. It may also be advantageous to use the so-called "interfacial polymerization" techniques to prepare the copolymers of this invention. Such techniques have been adequately described in the literature. The polymers may be prepared by either batch or continuous methods.

Although a catalyst need not be used in carrying out the condensation reaction, it has been found useful to employ an acid acceptor to take up the acid halide which is being evolved. Effective acid acceptors are strong bases such as the alkali carbonates, caustic alkali, tertiary amines or the like. If an acid acceptor is used, it will generally be in the range from about 1 to 5 times the theoretical amount of hydrogen halide released, as calculated from the molar proportions of reactants.

The polymers of this invention are generally white, however, depending on the purity of reactants and reaction conditions they may range through yellow to yellow-brown. They are soluble in solvents such as m-cresol, hexamethylphosphoric triamide, dimethyl sulfoxide, dimethyl formamide, and the like. Typically, polymer melt temperatures of the copolymers will range from about 150° C. to 350° C. and higher.

The thermoplastic polymers are useful for a variety of applications including fibers, films, foils, castings, adhesives, and the like. The polymers can be used as such or can be compounded with additives such as fillers, pigments, dyes, lubricants or other resins.

The following examples serve to illustrate the invention more fully, however, they are not intended to limit the scope thereof.

EXAMPLE I

A miniature flask assembly, consisting of a 4-necked flask fitted with a thermometer, stirrer, condenser and nitrogen inlet, was flamed while maintaining a nitrogen purge and 3.657 grams benzimidazolone, 5.5398 grams terephthaloyl chloride and 50 cc. 1,2,4-trichlorobenzene charged. The flask and its contents were heated to a maximum temperature of 209° C. with stirring, until the evolution of hydrogen chloride was negligible. There was a noticeable increase in the viscosity of the reaction mixture accompanied by a change in color as the reaction progressed. After 6½ hours the heating was discontinued, the reaction mixture cooled to room temperature and 200 cc. of methanol added. The resulting slurry was mixed in a blender and the polymer obtained by filtration. After washing a second time with alcohol followed by extraction with acetone, the polymer was dried in a vacuum oven. Polymer yield was 94%. The polymer melt temperature determined with a modified Dennis bar was 300° C.

A portion of the above polymer was dissolved in dimethyl formamide. The solution, containing about 25% by weight of the polymer, was brushed onto an iron sheet and the solvent evaporated. The dried film formed a tough, thermal resistant coating on the metal sheet.

When terephthaloyl chloride and benzimidazolone were reacted in the presence of other solvents such as dibenzyl, quinoline, α-picoline and glacial acetic acid, similar polymers were obtained. The polymer melt temperature of the copolymer obtained when acetic acid was used as the solvent was greater than 350° C.

EXAMPLE II

Similar to Example I, 4.6114 grams of isophthaloyl chloride, 3.043 grams of benzimidazolone, and 50 cc. of o-dichlorobenzene were charged to the flask containing 0.25 gram of 20 mesh magnesium powder. After heating the reaction mixture for about 3 hours at a temperature of about 180° C., the polymer was recovered after washing with a 10% aqueous hydrochloric acid solution, alcohol and extracting with acetone. The benzimidazolone-isophthaloyl chloride copolymer was obtained in 46.6% yield based on alcohol and acetone insolubles and had a polymer melt temperature of 300° C. Brittle fibers were drawn from the polymer melt.

EXAMPLES III–V

Benzimidazolone and o-phthaloyl chloride were bulk polymerized at temperatures ranging from 150° C. to 200° C. Table I sets forth the details of the polymerizations. The reactants were placed in a glass polymerization vessel and heated while a slow stream of nitrogen was passed through the reactor for removal of hydrogen chloride. The polymers were recovered in the usual manner and the percent yield is reported on the alcohol and acetone insolubles.

TABLE I

| Example: | Benzimidazolone, mols | o-Phthaloyl Chloride, mols | Polymerization Temp., °C. | Reaction Time, hours | Percent Polymer Yield | Polymer Melt Temp., °C. |
|---|---|---|---|---|---|---|
| III | 0.025 | 0.025 | 150 | 3 | 12.9 | 180 |
| IV | 0.025 | 0.025 | 175 | 3 | 46.5 | 268 |
| V | 0.025 | 0.025 | 200 | 2 | 61.6 | 270 |

EXAMPLE VI

Benzimidazolone (2.0135 grams), 2.63 grams of 1,4-bis(chloromethyl)benzene, 10 grams of potassium carbonate and 50 cc. dimethyl formamide were combined in a flask assembly similar to that described in Example I. The reaction mixture was heated at 100° C. for 2 hours, cooled and then poured into about 1 liter of water. The solid material recovered after filtration was washed several times with water and alcohol. An 80% yield of polymer based on alcohol insolubles was obtained. The light-colored polymer had a melt temperature of 213° C. and when heated for 15 minutes at 325° C. showed only 1.75% weight loss with negligible darkening. The resinous material was melted and extremely long fibers were drawn from the molten mass.

Similar polymers are obtained when 1,5-bis(bromomethyl)benzene is reacted with benzimidazolone.

EXAMPLE VII

Benzimidazolone and 1,4 - bis(chloromethyl) - 2,3,5,6-tetramethylbenzene were reacted to form a high molecular weight, thermally stable condensation polymer. The benzimidazolone (1.75 grams) and 3.014 grams of the 1,4-bis(chloromethyl)-2,3,5,6-tetramethylbenzene were combined in a flask with 10.3 grams potassium carbonate. The solid reactants were heated at 350° C. to a molten mass by immersing the flask in molten zinc chloride. The heating was continued for 10 minutes. The cooled reaction product was extracted with water to remove the potassium salts present and then with alcohol and acetone. Various molecular weight fractions of the condensation polymer formed were obtained and fibers drawn therefrom.

EXAMPLE VIII

Benzimidazolone (6.77 grams), 7.13 grams 1,5-dichloropentane and 9 grams potassium carbonate were dispersed in 200 cc. dimethyl formamide and heated at reflux for 3 hours. The reaction mixture was cooled and the solids separated by filtration. The filtrate was placed in a blender and water added slowly precipitating a gummy solid. The supernatant liquid was decanted and the solid dissolved in 50 cc. tetrahydrofuran. Portions of the tetrahydrofuran solution were dropped into water, maintained at 60° C. and thin films formed. Upon heating at 250–265° C. under high vacuum for 15 minutes, there was only a slight weight loss and darkening of the polymer.

Similarly, condensation polymers were obtained when other aliphatic alpha, omega-dihalides and aliphatic diacid halides, such as adipyl chloride, were reacted with benzimidazolone.

The above examples show that useful thermoplastic materials, capable of being drawn into fibers and being used as films, can be prepared by condensing benzimidazolone with a difunctional compound, wherein the difunctionality consists of a reactive halogen grouping.

I claim:

1. A thermoplastic condensation polymer of benzimidazolone containing recurring structural units of the formula

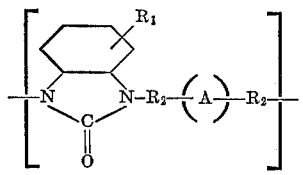

wherein $R_1$ is selected from the group consisting of hydrogen and alkyl containing from 1 to 8 carbon atoms, $R_2$ is selected from the group consisting of carbonyl and methylene, and A is selected from the group consisting of phenylene and alkylene containing 1 to 8 carbon atoms.

2. A polymer of claim 1 wherein $R_1$ is hydrogen and A is phenylene.
3. A polymer of claim 2 wherein $R_2$ is carbonyl.
4. A polymer of claim 3 wherein A is o-phenylene.
5. A polymer of claim 3 wherein A is m-phenylene.
6. A polymer of claim 3 wherein A is p-phenylene.
7. A polymer of claim 2 wherein $R_2$ is methylene.
8. A polymer of claim 7 whrein A is p-phenylene.
9. A polymer of claim 7 wherein A is 2,3,5,6-tetramethyl-1,4-phenylene.

References Cited

UNITED STATES PATENTS 2,913,433   11/1959   Wittbecker _____ 260—78

HAROLD D. ANDERSON, Primary Examiner

U.S. Cl. X.R.

117—161; 260—2, 78, 30.6, 30.8, 32.6, 33.4